United States Patent [19]

Glockemann

[11] Patent Number: 5,613,420
[45] Date of Patent: Mar. 25, 1997

[54] RECIPROCATING ENGINE

[75] Inventor: Ralph Glockemann, Candelo, Australia

[73] Assignee: Glockemann Peck Engineering Pty Ltd., Australia

[21] Appl. No.: 416,839

[22] PCT Filed: Oct. 22, 1993

[86] PCT No.: PCT/AU93/00547

§ 371 Date: Apr. 21, 1995

§ 102(e) Date: Apr. 21, 1995

[87] PCT Pub. No.: WO94/10452

PCT Pub. Date: May 11, 1994

[30] Foreign Application Priority Data

Oct. 27, 1992 [AU] Australia ................... PL5509

[51] Int. Cl.$^6$ ............................ F15B 13/04; F04B 43/06
[52] U.S. Cl. ................... 91/404; 91/442; 91/452; 417/395
[58] Field of Search .................. 60/325; 91/404, 91/442, 449, 452, DIG. 2; 92/130 R, 94; 417/375, 395, 401, 402

[56] References Cited

U.S. PATENT DOCUMENTS

| | | | |
|---|---|---|---|
| 1,581,945 | 4/1926 | Heerlein . | |
| 3,299,826 | 1/1967 | Williams | 91/404 X |
| 3,416,408 | 12/1968 | Freiberger | 92/94 X |
| 4,502,847 | 3/1985 | Pozniak et al. | 92/130 R X |
| 4,930,993 | 6/1990 | Han et al. | 417/226 |
| 5,246,351 | 9/1993 | Horn et al. | 417/395 X |
| 5,279,325 | 1/1994 | Kaspers | 92/94 X |

FOREIGN PATENT DOCUMENTS

| | | |
|---|---|---|
| 104257 | 6/1938 | Australia . |
| 2219694 | 9/1974 | France . |
| 197824 | 5/1923 | United Kingdom . |
| 2086990 | 5/1982 | United Kingdom . |

OTHER PUBLICATIONS

Abstract of SU-720196. (Water Resources Use). Mar. 08, 1980. 1 page.
Abstract of SE 7908270. (Hesselmar). May 11, 1981. 1 page.
Abstract of SU 1242653. (Kovalenko). Jul. 07, 1986. 1 page.
Abstract of SU 1742525-A1. (Kartashev). Jun. 23, 1992. 1 page.

*Primary Examiner*—Hoang Nguyen
*Attorney, Agent, or Firm*—Webb Ziesenheim Bruening Logsdon Orkin & Hanson, P.C.

[57] ABSTRACT

An engine for driving a piston arrangement for pumping water from an inlet to an outlet at a higher level is disclosed. The engine includes a hollow housing having an inlet and an outlet between which liquid passes, the housing at least partly enclosing a chamber through which the liquid flows from the inlet to the outlet. A movable wall is mounted in the housing and partly defines the chamber. A valve is provided to open and close the outlet so that when it closes, liquid in the chamber is suddenly decelerated producing an increase in pressure in the chamber to force the wall to move to a direction so as to increase the volume of the chamber. After an initial increase in the pressure, the water relaxes and the pressure decreases to such an extent that a spring will open the valve and the spring returns the wall to the position of decreased volume in the chamber. Thus, the wall is caused to reciprocate under the influence of pressure of the liquid increasing and decreasing as the valve is opened and shut.

19 Claims, 7 Drawing Sheets

RECIPROCATING ENGINE

BACKGROUND OF THE INVENTION

This invention relates to reciprocating engines, and especially, though not exclusively to low-head, water-powered reciprocating engines which can be used to pump liquid, such as water, at higher pressure than the pressure of the liquid used for driving the engine.

By low-head, it is meant that the liquid falls only a relatively short distance from the supply level to the operating level of the engine. The relatively short distance can be from a few meters to as little as a few centimeters.

BRIEF SUMMARY OF THE INVENTION

Accordingly, the invention provides an engine comprising:
- a hollow housing having an inlet and an outlet between which a liquid passes;
- a primary chamber into which the liquid enters as it passes from said inlet to said outlet;
- a movable wall continuously seal with and partly defining said primary chamber and movable from a first position to a second position in which the volume of the primary chamber is larger than when said wall is in said first position;
- valve means across said outlet, being mechanically biased to an open position wherein liquid is allowed to accelerate through said primary chamber from said inlet and through said outlet, said valve means being adapted to close when liquid force thereon from said accelerating flow exceeds said mechanical bias, whereupon liquid impact in said chamber causes said wall to move from its first position to its second position, the liquid in said primary chamber then relaxing to allow said mechanical bias to open said valve means; and
- return means to return said wall from the second position to the first position.

In a preferred embodiment, the valve means opens the outlet when the pressure of the liquid in the housing falls below a predetermined level.

The valve means preferably comprises a flap which opens and closes said outlet and biasing means acting to open the flap, the biasing force of the biasing means being sufficient to open the flap against the decreased pressure of the liquid in the housing, but insufficient to prevent closing of the flap when the force provided by the liquid accelerating from the inlet to the outlet rises above a particular level.

In one alternative embodiment, the valve means could be a timer-activated valve and be automatically opened and closed according to a predetermined timing pattern.

Preferably, said return means comprises means for biasing the wall towards the first position. The biasing force of the means for biasing the wall is preferably sufficient to overcome the decreased pressure of the liquid in the chamber so that said wall moves back to the first position, but is insufficient to prevent said wall being moved towards the second position by the increased pressure of the liquid in the chamber.

In a preferred embodiment, the housing at least partly defines and encloses said chamber.

In an alternative embodiment, the chamber is in fluid connection with the housing between said inlet and said outlet.

In one embodiment, the wall comprises a diaphragm. Preferably a piston is coupled to the diaphragm to provide the reciprocating motion for coupling to an attachment to the engine. Alternatively, the wall could itself form part of a piston arrangement, a bellows arrangement or a concertina arrangement, with a piston being coupled thereto.

The piston could be directly coupled to the wall, or could be coupled thereto via return springs, which absorb energy from the movement of the wall towards the second position and transfer the energy to the piston when the wall moves towards the first position.

In an embodiment, the housing at least partly defines a second chamber provided with an inlet and an outlet and the wall at least partly defines the second chamber, the outlet of the second chamber being openable and closable out of phase with that of the first-mentioned chamber so that the wall is moved from the first position to the second position by the liquid in the first chamber decelerating and providing an increased pressure on one side of the wall and is moved from the second position to the first position by liquid in the second chamber decelerating and producing an increased pressure on the other side of the wall when there is decreased pressure on the one side of the wall.

In one preferred embodiment, the wall is coupled to a reciprocating piston movable within a cylinder of a fluid pump arrangement to pump fluid, the cylinder being connected to a pumped fluid inlet via a first one-way valve and to a pumped fluid outlet via a second one-way valve. Movement of the wall, and hence of the piston, from the second position to the first position thus causes flow of the pumped fluid from the pumped fluid inlet through the first one-way valve into the cylinder, and movement of the wall, and hence the piston, from the first position to the second position causes flow of the pumped fluid through the second one-way valve and through the pumped fluid outlet.

In one embodiment, the pump arrangement is used to pump water. In an alternative embodiment, the pump arrangement is connected to supply fluid to a turbine to produce electricity.

In one preferred embodiment, a pressure vessel having a compressible element therein is connected between the second one-way valve and the pumped fluid outlet to smooth the flow of pumped fluid through the pumped fluid outlet. The compressible element can be a bag having compressible fluid therein, or could be a solid compressible element. The compressible element is compressed by the pumped fluid flowing through the second one-way valve and expels the pumped fluid when no fluid is flowing through the second one-way valve, thereby smoothing the flow of the pumped fluid through the outlet.

In a further preferred embodiment, the valve means is controlled by a flood deactivating mechanism to prevent closure of the outlet during flood conditions. The flood deactivating mechanism preferably comprises a float switch coupled to rotate a pivoting arm into engagement with the valve means to prevent closure of the outlet.

BRIEF DESCRIPTION OF THE DRAWINGS

Embodiments of an engine according to the invention will now be more fully described, by way of example, with reference to the drawings, of which.

DETAILED DESCRIPTION OF THE DRAWINGS

Figure 1:
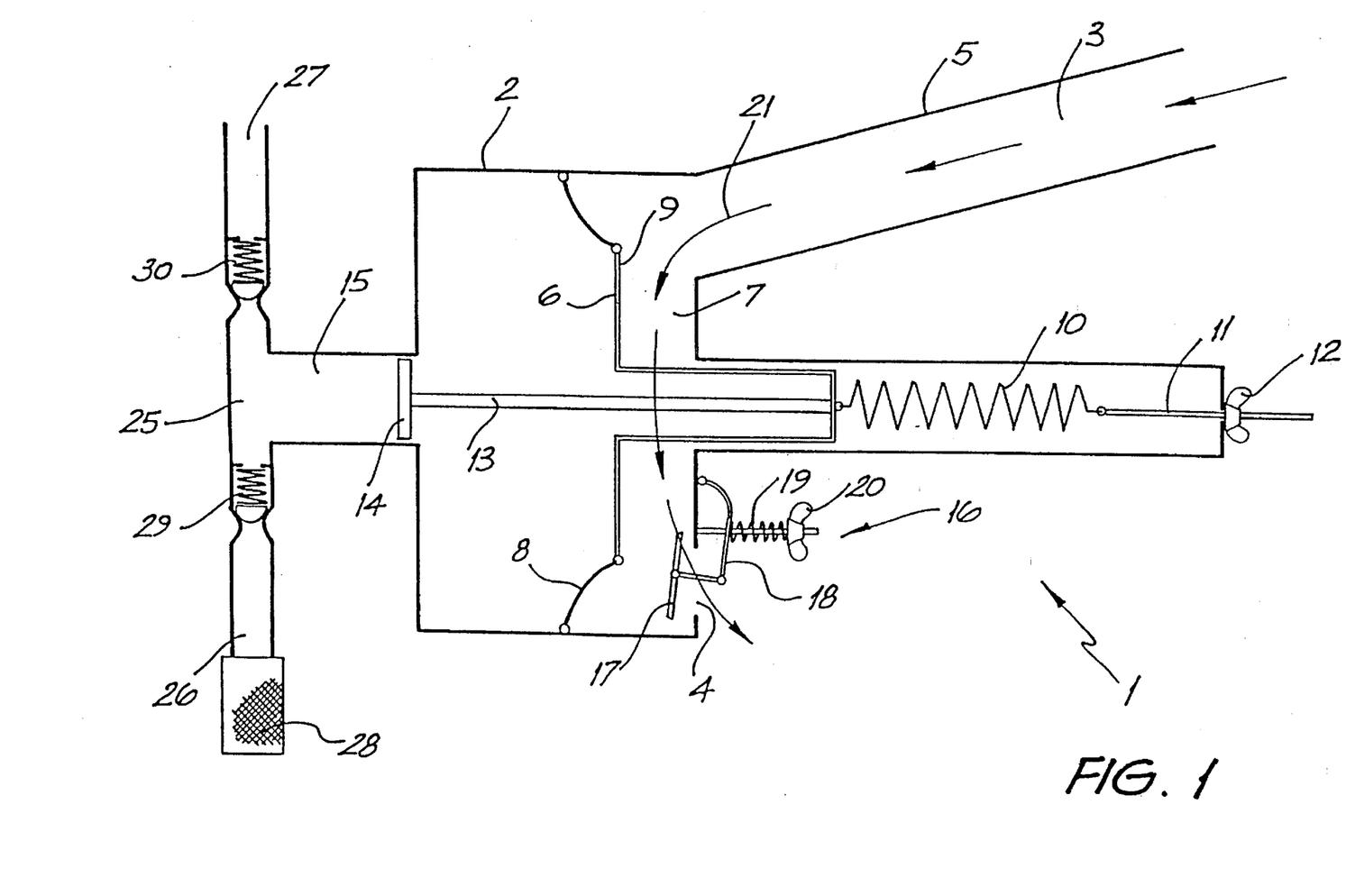
FIG. 1 is a schematic cross-sectional view of a first embodiment of an engine according to the invention in a first phase of its operation.
Figure 2:
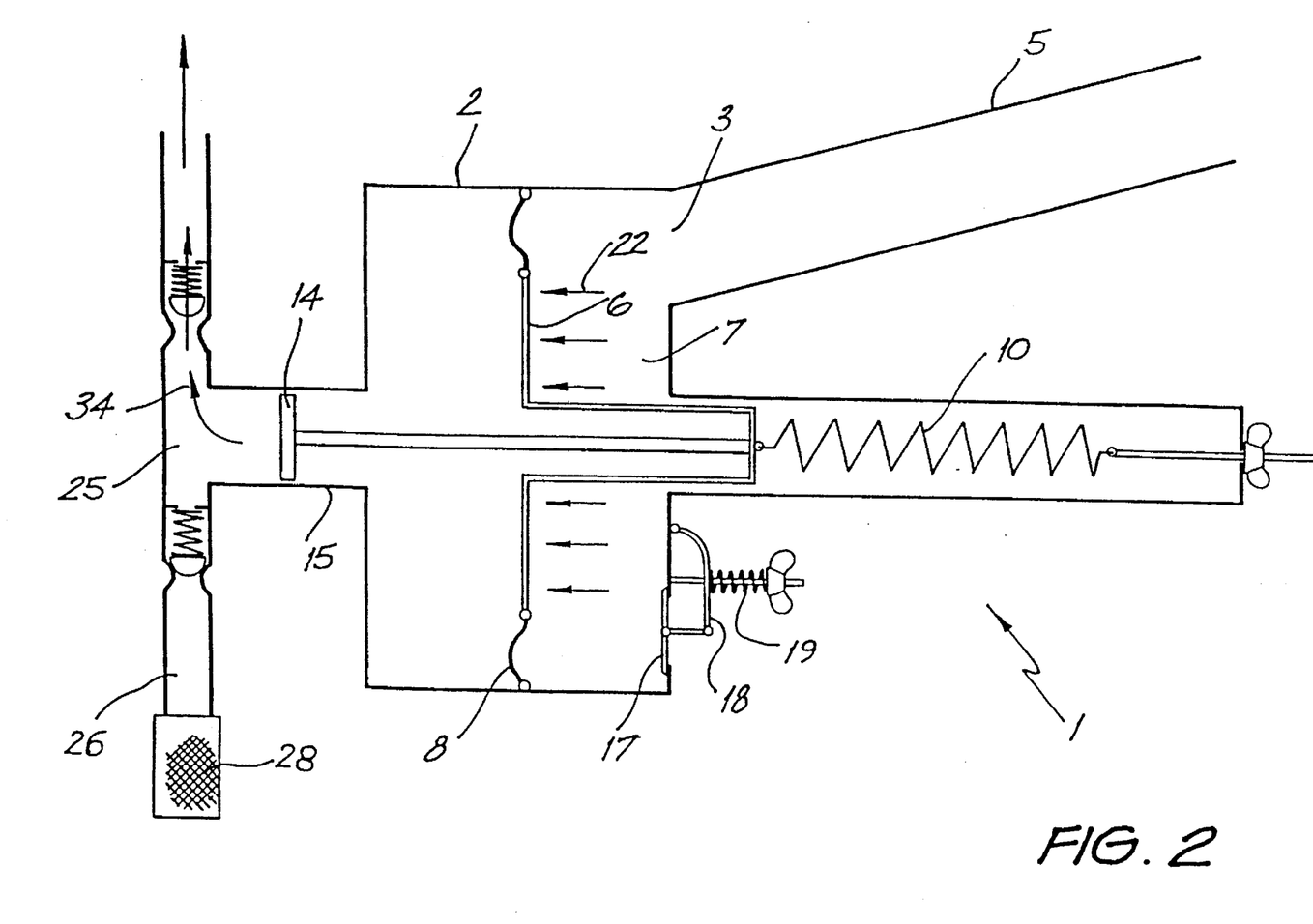
FIG. 2 is a view of the engine of FIG. 1 showing the engine in a second phase of its operation.
Figure 3:
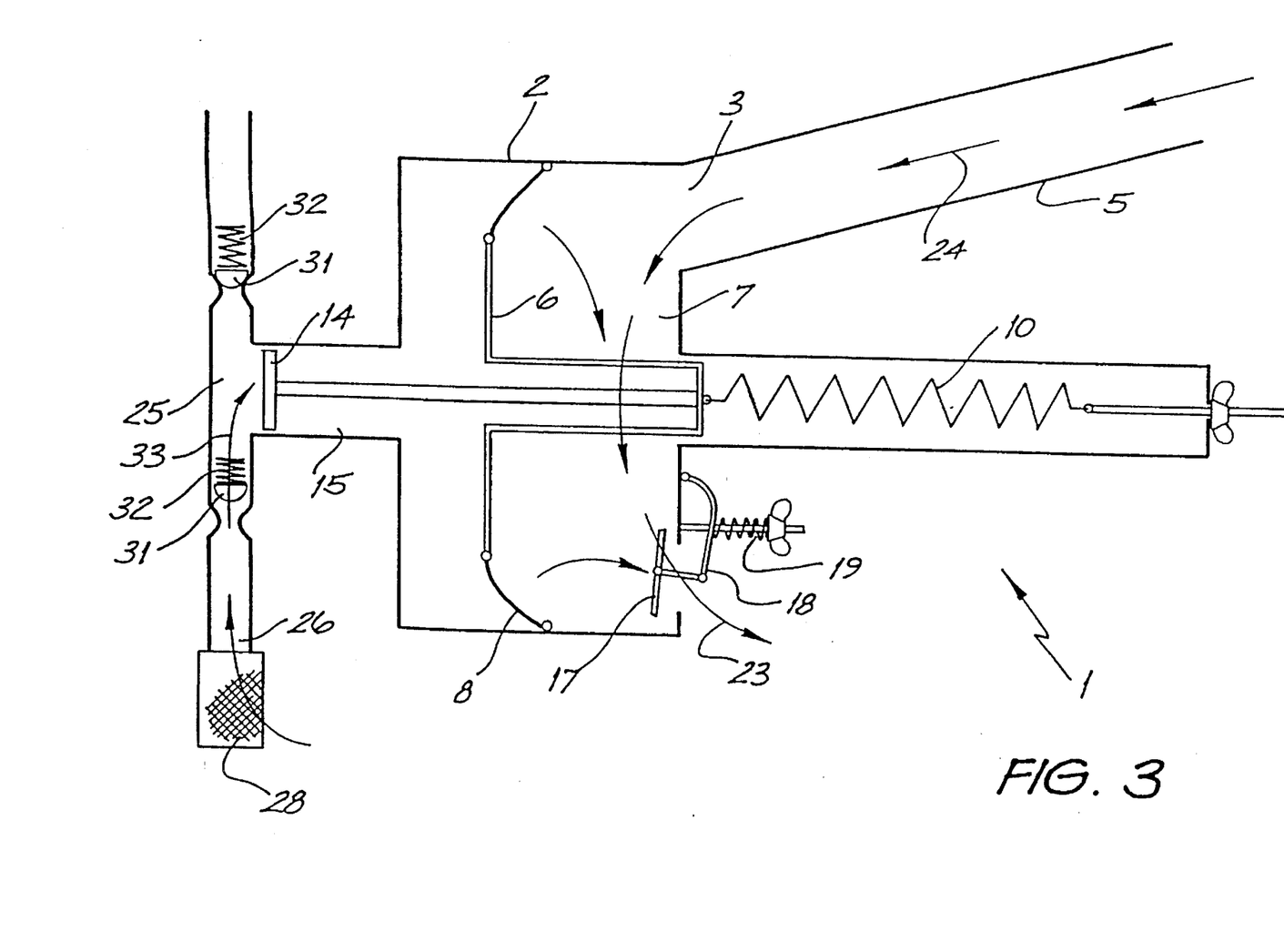
FIG. 3 is a view of the engine of FIGS. 1 and 2 in a third phase of its operation.

As shown in FIGS. 1 to 3 of the drawings, a first embodiment of an engine 1 according to the invention includes a housing 2 having an inlet 3 and an outlet 4. The inlet 3 is coupled to one or more pipes 5, which direct water from a source, such as a river, into the inlet 3 of the housing 2. The source of the water should be above the level of the inlet 3 so that the water enters the inlet under the action of gravity. The height of the source above the inlet can be anything from a few centimeters to a few meters.

Within the housing 2 there is mounted a diaphragm 6, which can move within the housing 2 and which partly defines a chamber 7 in the housing between the diaphragm 6 and the side of housing 2 having the inlet 3 and the outlet 4 so that water entering through the inlet 3 flows through the chamber 7 and out through outlet 4. The diaphragm 6 is mounted on flexible rubber mounts 8, which enable the diaphragm to move between a first position, as shown in FIG. 1, where the volume of the chamber 7 so defined, is relatively small, and a second position, shown in FIGS. 2 and 3, where the volume of the chamber 7 is relatively large.

A tension spring 10 is attached between the diaphragm 6 and a threaded shaft 11 passing through the housing 2 so that, when the diaphragm is forced to its second position, the spring 10 is put under tension and acts to return the diaphragm to its first position. A wing nut 12 is threaded on the shaft 11 outside the housing and can be used to adjust the tension in the spring 10.

Also attached to the diaphragm 6, via a shaft 13, is a piston 14, which moves within a cylinder 15 when the diaphragm moves between its first and second positions.

The outlet 4 is closable by a flap valve 16 including a flap element 17 which can cover the outlet 4 to close it and which is attached to a resilient element 18 attached to the housing 2. The resilient element 18 is biased by a compression spring 19 to bias the flap element 17 to the open position. The compression of the compression spring 19 is adjustable by means of a wing nut 20.

The operation of the engine 1 in order to reciprocate piston 14 in cylinder 15 will now be described.

Starting in the position shown in FIG. 1, the diaphragm 6 is in the first position such that the chamber 7 Is of relatively small volume and the flap valve 16 is held open by the bias of compression spring 19. As water from the source flows through pipe 5 and inlet 3 into the chamber 7, as indicated by arrow 21, and out through outlet 4, it accelerates, building up momentum and force until the flap element 17 is closed against the action of compression spring 19. Water can therefore not flow out through the outlet 4. As the water in the chamber 7 is thus decelerated, it increases the pressure in the chamber 7 which acts against a side 9 of the diaphragm 6 to force diaphragm 6 to move to its second position against the bias of tension spring 10. This, of course increases the volume of chamber 7.

However, after a relatively short period of time, the water in the chamber relaxes and the pressure decreases until the pressure acting against the diaphragm 6, shown by arrows 22, and against flap element 17, becomes less than the biasing force of tension spring 10 and compression spring 19. Accordingly, as shown in FIG. 3, the flap valve 16 will open allowing water to flow out through outlet 4, as shown by arrow 23, and the diaphragm 6 will be returned to its first position by the bias of tension spring 10. Water will then once again flow through pipe 5, inlet 3, as illustrated by arrow 24, and accelerate through chamber 6 and outlet 4, and the cycle will repeat.

Thus, the piston 14, attached to diaphragm 6 will reciprocate in cylinder 15 as diaphragm 6 moves between its first and second positions.

Figure 5:
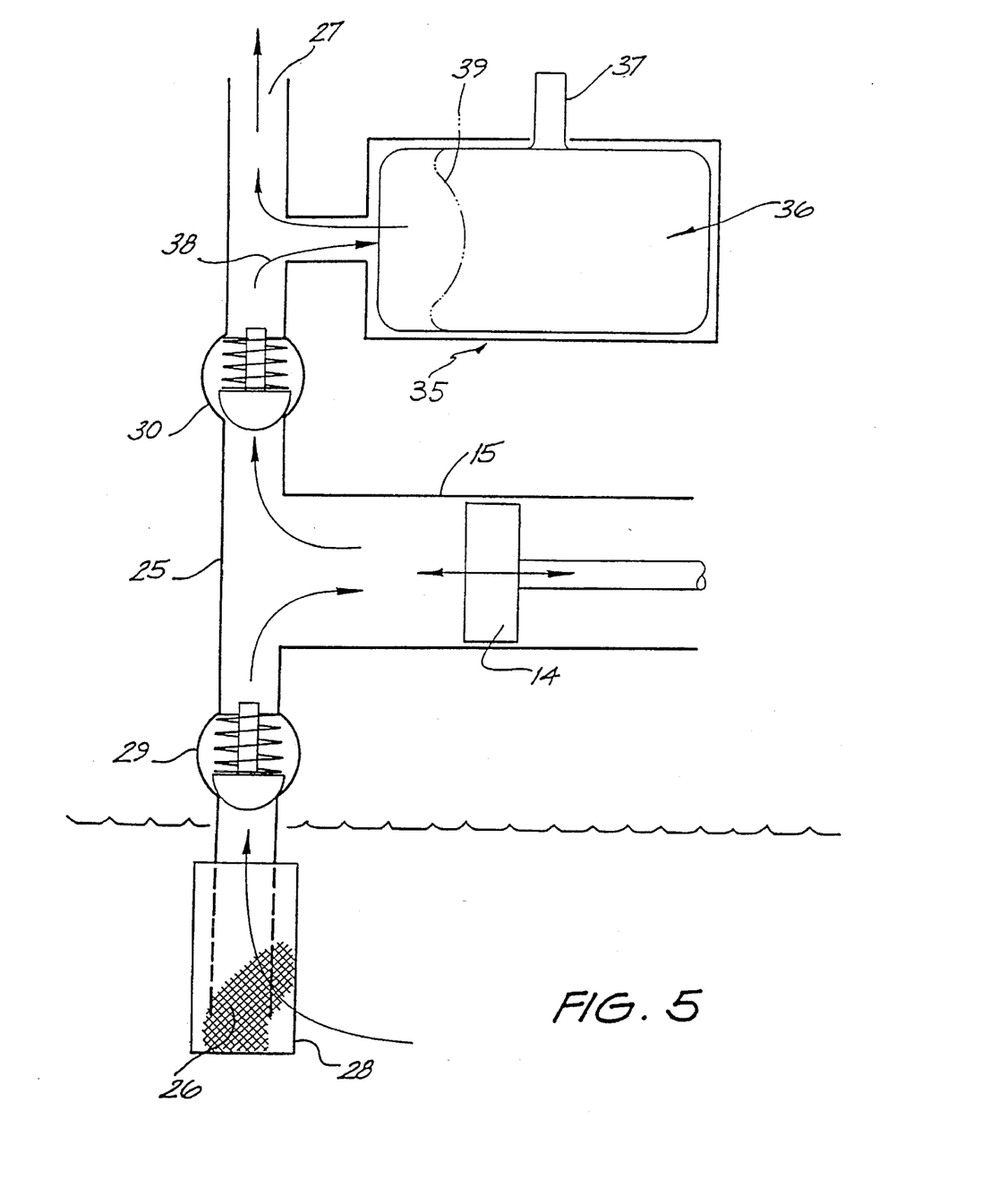
FIG. 5 is a schematic cross-sectional view, similar to that of FIGS. 1 to 4 of a pumping arrangement used with the engine.

In this embodiment, the piston 14 and cylinder 15 arrangement is used to pump water to a higher level than that of the source. It will however be appreciated that the action of the reciprocating piston can be utilised to power any desired attachment. In this embodiment, the cylinder 15 is in fluid communication with a pipe 25 extending between an inlet 26 positioned in a source of liquid to be pumped at a lower level and an outlet 27 for the pumped liquid. Conveniently, the liquid to be pumped is water from the same body of water as as the water flowing from outlet 4 of the engine 1 enters. A filter 28 is positioned around the inlet 26 in the source of water to be pumped.

Between the cylinder 15 and the inlet 26, in the pipe 25, there is positioned a one-way valve 29 arranged to allow liquid flow only in the direction from the inlet 26 towards the cylinder 15. Between the cylinder 15 and the outlet 27, in the pipe 25, there is positioned a one-way valve 30 arranged to allow liquid flow only in the direction from the cylinder 15 towards the outlet 27. The one-way valves 29 and 30 conveniently comprise plugs 31, which sit on a constriction in pipe 25 and which are biased by the action of springs 32 towards the constriction so as to close the pipe 25 to liquid flow.

When the piston 14 is in its outward position, as shown in FIG. 3, and is then moved back towards an inner position, it sucks liquid up through inlet 26 and one-way valve 29, as shown by arrow 33, into cylinder 15, until the position shown in FIG. 1 is reached. In the next half of the cycle, where the piston is moved outwardly again, liquid is pumped out through one-way valve and outlet 27, as shown by arrow 34. Thus, a pulsing form of pump action takes place.

In order to smooth this pulsing form of pump action, and improve the efficiency of the pump, a pressure vessel 35 is provided in liquid communication with the pipe 25 between the one-way valve 30 and the outlet 27. The pressure vessel 35 contains therein a cushion 36 which can contract and expand as pressure is applied thereto and released. The cushion 36, for example, comprises a bladder filled with air or foam rubber,. The bladder has an outlet valve 37 extending through a wall of the pressure vessel 35 so that the pressure of the air in the cushion can be adjusted.

Thus, as liquid is pumped from the inlet 26, via cylinder 15, through one-way valve 30 towards outlet 27 in a pulsing cycle, as indicated by arrows 38, when the liquid is under pressure from the pumping action, it enters the pressure vessel 35 and depresses the cushion 36, which contracts, as shown by dotted line 39. When the pressure is released by the pumping action, the cushion expands and forces the liquid from the pressure vessel 35 towards the outlet 27. The pulses of liquid from the outlet as therefore not so sudden and the pressures in the pipe 25 are reduced. This can protect a discharge pipe if it is already close to its maximum pressure rating.

Figure 4:
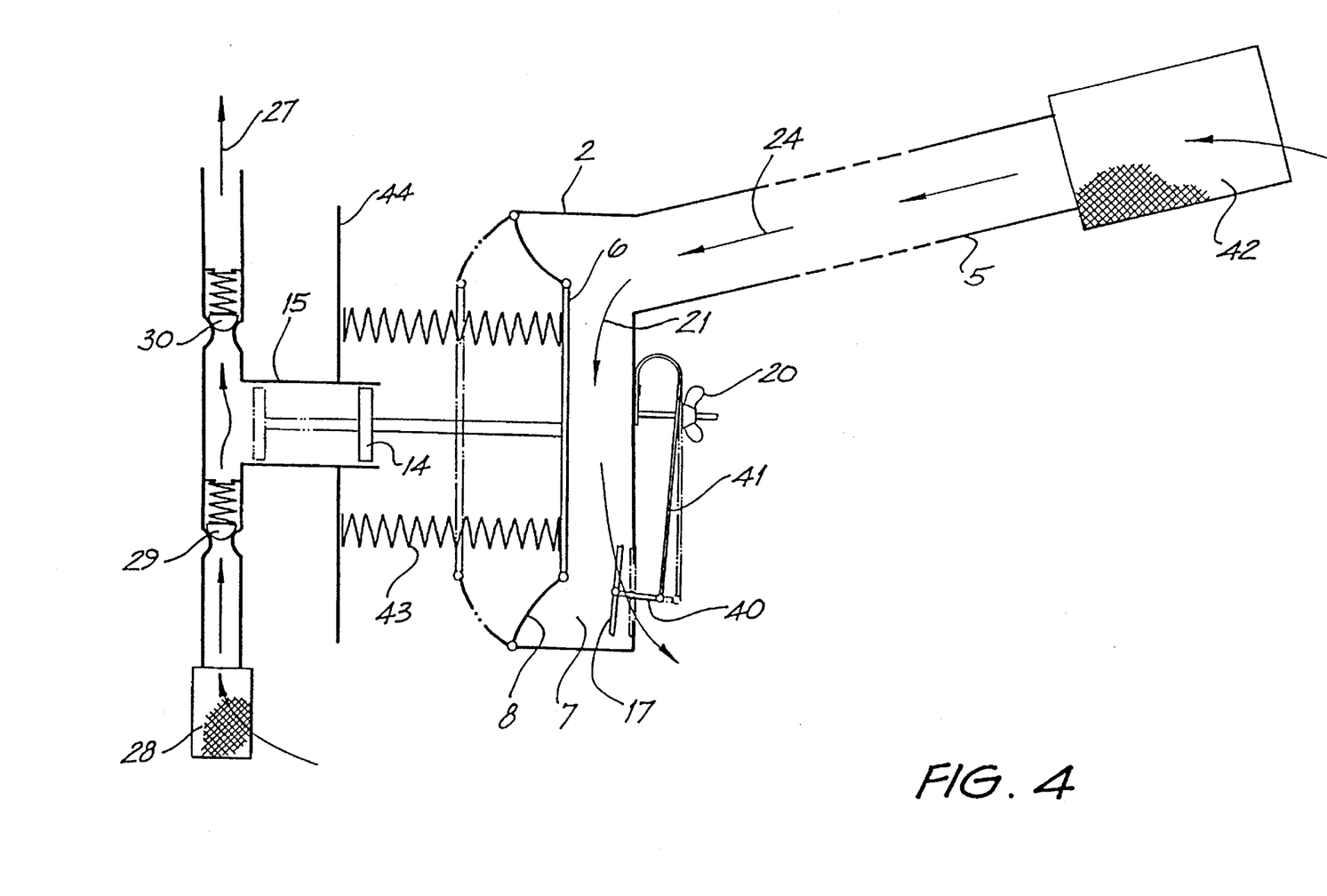
FIG. 4 is a schematic cross-sectional view of a second embodiment of an engine according to the invention.

FIG. 4 shows a second embodiment of an engine according to the invention. In this Figure, all elements similar to those of the first embodiment are designated by the same reference numerals. In this embodiment, the diaphragm 6 is not positioned within the housing 2, but forms, together with mounts 8, one side of the housing 2. The flap element 17 is coupled, via one or more coupling elements 40, to a leaf spring 41 forming a resilient element. The leaf spring 41 is arranged to bias the flap element 17 to the open position and the bias force can be adjusted using wing nut 20.

In this embodiment, a filter 42 is provided at the end of pipe 5 to make sure that silt and other contamination from the water supply does not enter the engine and clog the interior or the inlet or outlet.

Furthermore, the diaphragm 6 is not biased to its first position by means of a tension spring but by a pair of compression springs 43, which act between an abutment surface 44 on the outside of the housing 2 and the outside of diaphragm 6. Otherwise, the second embodiment functions in the same way as the first embodiment.

Figure 6:
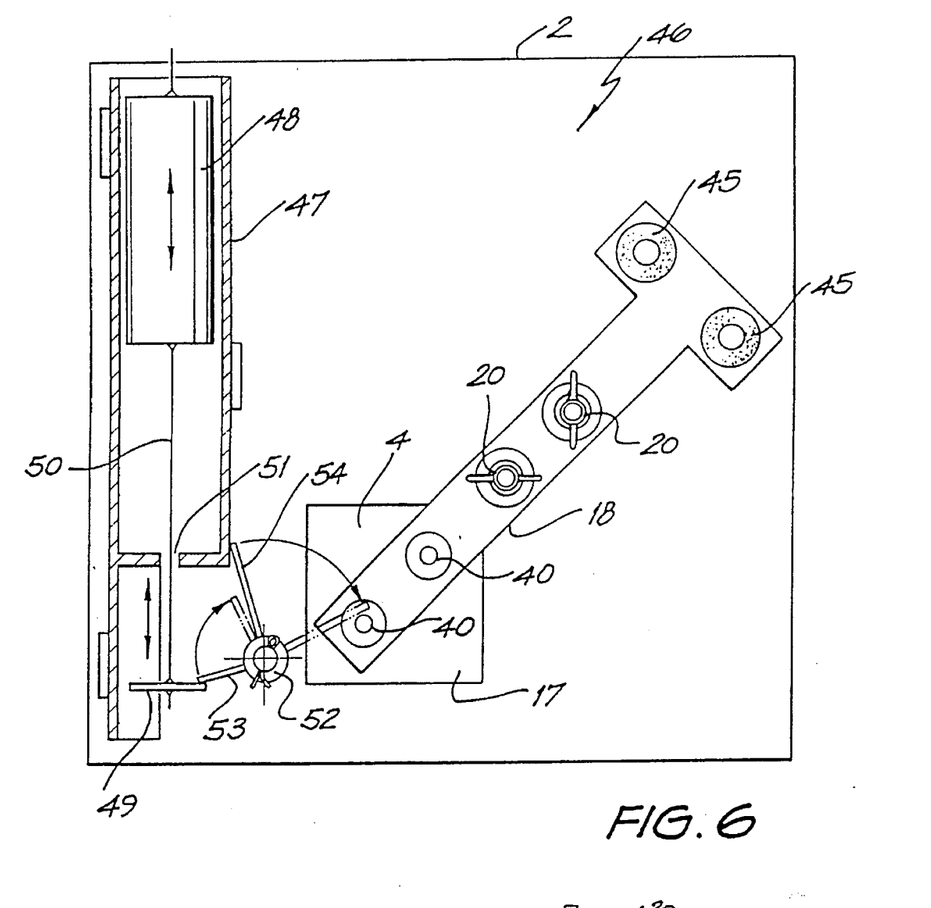
FIG. 6 is a part cross-sectional side view of an apparatus for attachment to an engine according to the invention.
Figure 7:
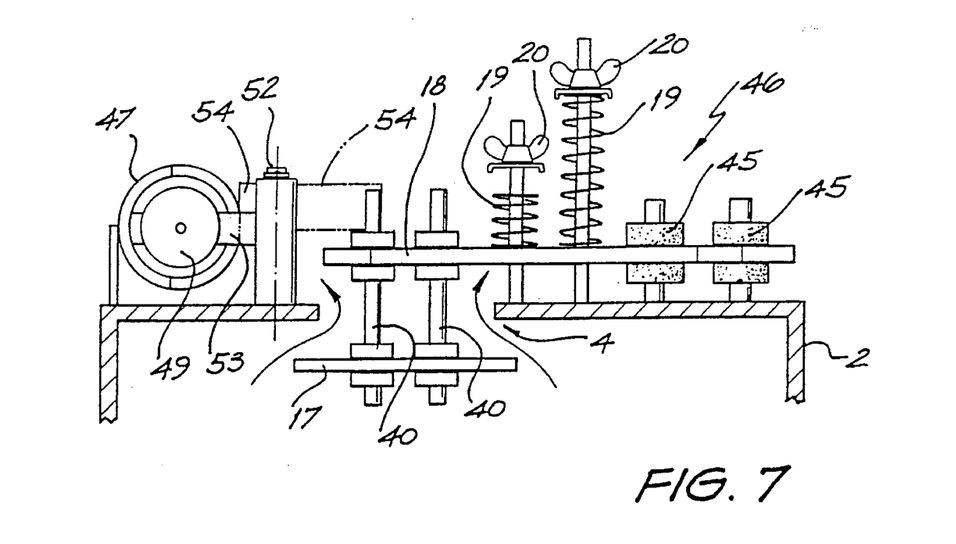
FIG. 7 is a cross-sectional view through the apparatus of FIG. 6 along line VI—VI thereof.

In cases of floods, it is usually undesirable to pump the floodwater as it is commonly silted and otherwise not suitable. Silted floodwater would be abrasive and damaging to the internal components of the pump. That is, scoring of sliding components should be avoided. In order to prevent the engine and pump arrangement from operating in cases of flood, there can be provided a flood deactivating device, which is shown in FIGS. 6 and 7 attached to the outside of housing 2 of the engine 1. In this embodiment, as best shown in FIG. 7, the flap element 17 is coupled by two threaded shafts 40 to the resilient element 18, which is attached to housing 2 via a rubber hinge 45 and is arranged to be biased towards the position where the outlet 4 is open by means of adjustment springs 19, which are adjustable using wing nuts 20.

As best shown in FIG. 6, the flood deactivating device 46 includes a cylinder 47 mounted substantially vertically on the housing 2 of engine 1. Inside the cylinder 47 a float 48 is allowed to move up and down according to the level of the water surrounding the engine 1. A disc 49 is coupled to the bottom of the float 48 by means of a rod 50, which passes through an aperture 51 in the bottom of cylinder 47. Adjacent the disc 49, there is rotatably mounted on the housing 2 a cam 52. The cam 52 has two vanes 53 and 54, extending at 90 degrees to each other and rotating together. One vane 53 is arranged to extend above disc 49; the other vane 54 Is arranged to extend generally upwardly, Thus, when there is no flood, float 48 is at the bottom of the cylinder 47 and disc 49 is below vane 53, which therefore causes the cam 52 to rotate until vane 53 rests on disc 49 and vane 54 is rotated away from resilient element 18, which can therefore function normally and the outlet 4 can be opened and closed as required. Vanes 53 and 54 are shown in bold lines in FIG. 6 in this position. However, when there is a flood and float 48 moves to the top of cylinder 47, it pulls the disc 49 up, thus causing vane 53 to be moved up, thereby rotating cam 52 until vane 54 is positioned over the resilient element 18 and thereby prevents it from moving. Vanes 53 and 54 are shown in dashed lines in FIG. 6 in this position. Therefore the outlet 4 remains open and the engine cannot pump water. The vanes are arranged so that, once the vane 54 is positioned over resilient element 18, it remains in this position and needs to be manually reset after the flood has receded.

Figure 8:
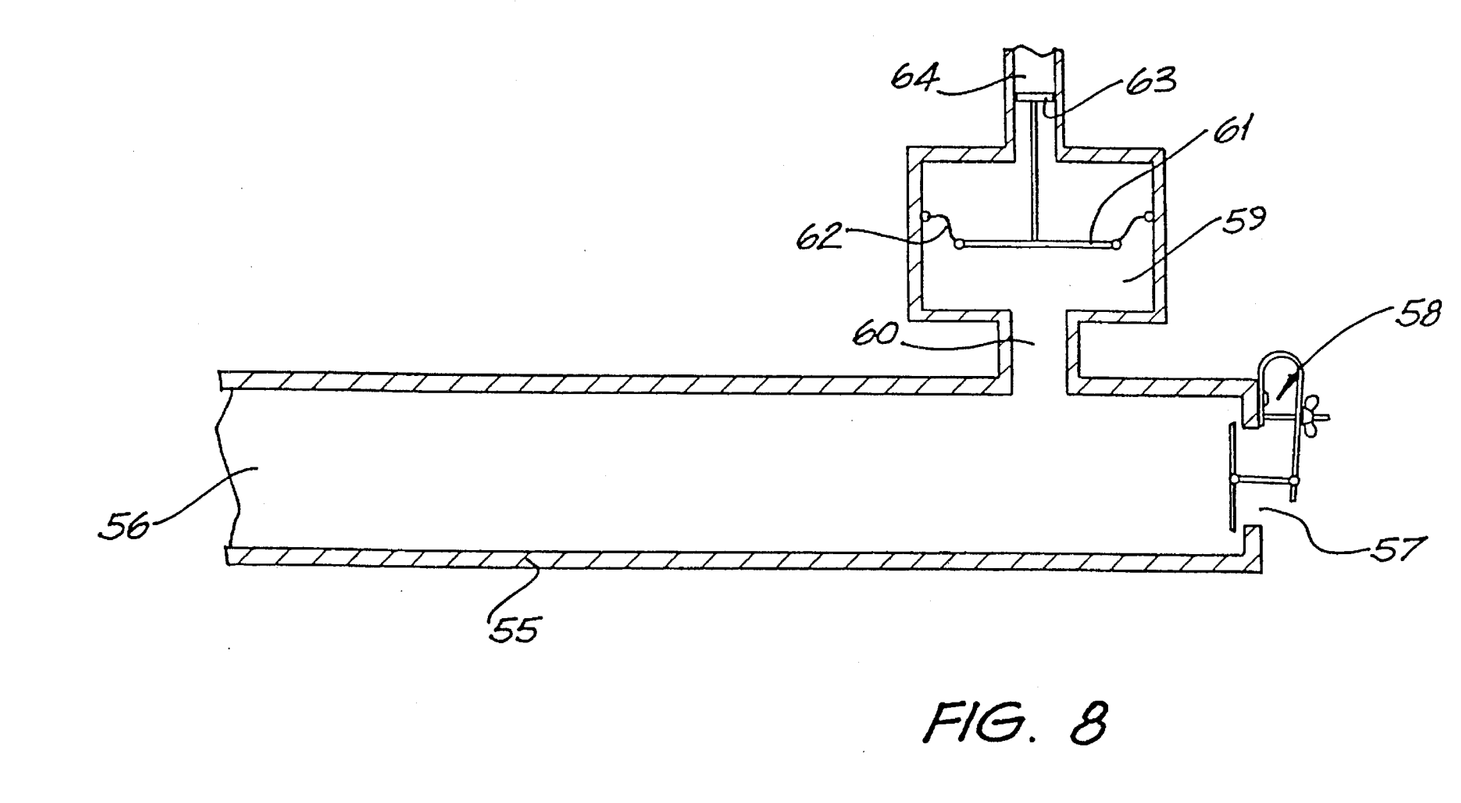
FIG. 8 is a schematic cross-sectional view of a further embodiment of an engine according to the invention.

In FIG. 8, there is shown a top cross-sectional view through a further embodiment of an engine according to the invention. In this embodiment, a large pipe 55 has an inlet 56 and an outlet 57 and is provided with a valve 58, similar to the valve shown in FIG. 4, adjacent the outlet 57 so as to open and close the outlet 57. A chamber 59 is provided adjacent the pipe 55 and in fluid communication therewith via a connecting pipe 60. A diaphragm 61 is mounted on mounts 62 in the chamber 59, similarly to diaphragm 6 in chamber 7 of FIGS. 1 to 3, and a piston 63 is connected to the diaphragm 61 so as to reciprocate in cylinder 64. The reciprocating action of the piston 63 in cylinder 64 can, of course, be used for any purpose.

In this embodiment, water enters pipe 55 through inlet 56 and accelerates through the pipe 55 before it flows out through outlet 57. When the momentum and force of the water is sufficient to close valve 58, the water in the pipe 55 is suddenly decelerated and increases the pressure of the water in the chamber 59, via the connecting pipe 60, so as to move the diaphragm 61. When the water relaxes and the pressure is decreased sufficiently for the valve 58 to open and the diaphragm to be returned by the action of a spring (not shown), the water flowing through the pipe 55 can start to accelerate again and the cycle repeats. Thus, this embodiment functions similarly to the other embodiments except that the chamber itself only has one opening which functions as both the inlet and the outlet, in turn.

Other variations, modifications and improvements will be apparent to a person skilled in the art without departing from the scope of the present invention. For example, the valve closing the outlet 4 could be timer activated to open and close in a predetermined cycle. A second chamber, inlet and outlet with valve could be provided in the housing on the other side of the diaphragm from the first chamber and arranged so that water pressure moves the diaphragm in both directions. The diaphragm could be arranged to activate a double acting piston pump or large return springs could be used to absorb energy from the diaphragm movement and then push the pump piston while the diaphragm is returning to its first position. Furthermore, the engine could be designed so that a low pressure effect causes the diaphragm to return to the first position.

I claim:

1. An engine comprising:
   a hollow housing having an inlet and an outlet between which a liquid passes;
   a primary chamber into which the liquid enters as it passes from said inlet to said outlet;
   a movable wall continuously sealed with and partly defining said primary chamber and movable from a first position to a second position in which the volume of said primary chamber is larger than when said wall is in said first position;
   valve means across said outlet;
   a mechanical biasing means biasing said valve means to an open position wherein liquid is allowed to accelerate through said primary chamber from said inlet and through said outlet, said valve means being adapted to close when liquid force thereon from said accelerating flow exceeds said mechanical bias of said mechanical means, whereupon liquid impact in said primary chamber causes said wall to move from said first position to said second position, the liquid in said primary chamber then relaxing to allow said mechanical bias of said mechanical biasing means to open said valve means; and return means to return said wall from said second position to said first position.

2. An engine according to claim 1, wherein said valve means comprises a flap which opens and closes said outlet and said mechanical bias of said mechanical biasing means acts to open said flap, the biasing force of said mechanical biasing means being sufficient to open said flap against the decreased pressure of the liquid in said housing, but insufficient to prevent closing of said flap when the force provided by the liquid accelerating from said inlet to said outlet rises above a particular level.

3. An engine according to claim 1, wherein said valve means is a timer-activated valve and is automatically opened and closed according to a predetermined timing pattern.

4. An engine according to claim 1, wherein said return means comprises means for biasing said wall towards said first position.

5. An engine according to claim 4, wherein the biasing force of said means for biasing said wall is sufficient to overcome the relaxed pressure of the liquid in said primary chamber so that said wall moves back to said first position, but is insufficient to prevent said wall being moved towards said second position by increased pressure of the liquid in said primary chamber.

6. An engine according to claim 1, wherein said housing at least partly defines and encloses said primary chamber.

7. An engine according to claim 1, wherein said primary chamber is in fluid connection with said housing between said inlet and said outlet.

8. An engine according to claim 1, wherein said wall comprises a diaphragm.

9. An engine according to claim 1, wherein a piston is coupled to said wall to provide reciprocating motion for coupling to an attachment to said engine.

10. An engine according to claim 1, wherein said wall forms part of a bellows arrangement.

11. An engine according to claim 9, wherein said piston is directly coupled to said wall.

12. An engine according to claim 9, wherein said piston is coupled to said wall via return springs, which absorb energy from the movement of said wall towards said second position and transfer the energy to said piston when said wall moves towards said first position.

13. An engine according to claim 6, wherein said housing at least partly defines a second chamber provided with an inlet and an outlet and said wall at least partly defines said second chamber, said outlet of said second chamber being openable and closable out of phase with that of said primary chamber so that said wall is moved from said first position to said second position by the liquid in said primary chamber decelerating and providing an increased pressure on one side of said wall and is moved from said second position to said first position by liquid in said second chamber decelerating and producing an increased pressure on the other side of said wall when there is decreased pressure on the one side of said wall.

14. An engine according to claim 1, wherein said wall is coupled to a reciprocating piston movable within a cylinder of a fluid pump arrangement to pump fluid, said cylinder being connected to a pumped fluid inlet via a first one-way valve and to a pumped fluid outlet via a second one-way valve, whereby movement of said wall and of said piston from said second position to said first position causes flow of the pumped fluid from said pumped fluid inlet through said first one-way valve into said cylinder, and movement of said wall and said piston from said first position to said second position causes flow of the pumped fluid through said second one-way valve and through said pumped fluid outlet.

15. An engine according to claim 14, further comprising a pressure vessel having a compressible element therein connected between said second one-way valve and said pumped fluid outlet to smooth the flow of pumped fluid through said pumped fluid outlet.

16. An engine according to claim 15, wherein said compressible element is a bag having compressible fluid therein.

17. An engine according to claim 15, wherein said compressible element is a solid compressible element.

18. An engine according to claim 1, wherein said valve means is controlled by a flood deactivating mechanism to prevent closure of said outlet during flood conditions.

19. An engine according to claim 18, wherein said flood deactivating mechanism comprises a float switch coupled to rotate a pivoting arm into engagement with said valve means to prevent closure of said outlet.

\* \* \* \* \*